United States Patent Office 2,915,545
Patented Dec. 1, 1959

2,915,545

CHLORINATION OF AROMATIC POLYISO-CYANATES

James Junkichi Tazuma, Trenton, N.J., assignor to Food Machinery and Chemical Corporation, New York, N.Y., a corporation of Delaware No Drawing. Application March 20, 1957
Serial No. 647,188

9 Claims. (Cl. 260—453)

This invention relates to polychlorinated aromatic diisocyanates and to methods of preparing them. More particularly, this invention relates to the polysubstitution of chlorine atoms in the nucleus of the aromatic ring of an aromatic diisocyanate.

Aromatic polyisocyanates, particularly aromatic diisocyanates such as m-phenylene diisocyanate, p-phenylene diisocyanate, 2,4- and 2,6-tolylene diisocyanate and mixtures of these compounds have found considerable use in recent years as intermediates in the manufacture of rigid and flexible foams, adhesive coatings and highly abrasion-resistant rubber substitutes.

In certain of these applications it has been found advantageous to replace part or all of the aromatic diisocyanate by a halogenated aromatic diisocyanate. For example, the halogenated aromatic isocyanates are generally more reactive with active-hydrogen compounds, such as alcohols, phenols, amines, mercaptans, and carboxylic acids, than are the corresponding non-halogenated isocyanates. Furthermore, compositions derived from halogenated aromatic diisocyanates tend to exhibit enhanced flame resistance, greater stability towards sunlight, and other desirable qualities. Of particular value are the chlorinated aromatic diisocyanates in which three or four chlorine atoms have replaced hydrogen atoms in the aromatic ring.

Prior to the time of this invention there was no satisfactory method of polychlorinating an aromatic diisocyanate to obtain a trichloro- or tetrachloro-diisocyanate, and it was accordingly necessary to prepare such diisocyanates by phosgenation of expensive and difficultly obtainable polychloro aromatic diamines.

It is an object of this invention to provide a simple and economical process of preparing trichloro- and tetrachloro-aromatic diisocyanates.

Another object is to provide a catalytic process for the polychlorination of aromatic diisocyanates.

A further object of this invention is to provide a process for chlorinating aromatic polyisocyanates whereby under controlled catalyst conditions the formation of either trichloro isocyanate or tetrachloro isocyanate is favored.

Other objects will become apparent to those skilled in the art from the disclosure which follows.

These and other objects are accomplished by conducting the chlorination of the aromatic diisocyanate in the presence of catalytic amounts of anhydrous ferric halide.

The term polychlorination when used in this specification and appended claims means a chlorination which produces a compound having three or four chlorine atoms attached to a carbon in the aromatic nucleus.

Illustrative but not limitative of aromatic diisocyanates which may be chlorinated in accordance with this invention are m-phenylene diisocyanate, p-phenylene diisocyanate, 2,4-tolylene diisocyanate, 2,6-tolylene diisocyanate, and isomeric naphthalene diisocyanates.

Catalysts suitable for use in this invention are anhydrous ferric chloride, anhydrous ferric bromide, and anhydrous ferric iodide. For reasons of economy, availability, and convenience, I prefer to employ ferric chloride. The ferric halide may be added as such, or may be formed in situ. For example, ferric chloride may be generated from iron powder, iron turnings or an iron oxide, carbonate, or acetate. When the catalyst is formed in situ from iron or an iron compound, there is sometimes a short induction period before the ferric-halide catalyzed substitution reaction commences, which induction period I interpret as representing the time during which the ferric halide is being formed.

Halogen carriers such as the chlorides of aluminum, copper, tin, titanium, zinc, chromium, antimony and mercury have been found to be mildly effective as catalytic agents for the polychlorination of aromatic diisocyanates but they do not approach the effectiveness of the ferric halides as promoters of polychlorination.

A suitable temperature for conducting the chlorination reaction is a temperature at which the diisocyanate is liquid. For phenylene diisocyanates I prefer to use a temperature of about 140° to 200° C., while for tolylene diisocyanates a temperature of about 80° to 100° C. is preferred.

The chlorination is ordinarily conducted at atmospheric pressure, though superatmospheric pressures may be used advantageously in some cases.

Conventional types of chlorination equipment may be used, the chief requirements being that it should resist corrosion by the chemicals involved (chlorine, ferric halide, hydrogen chloride, aromatic diisocyanates, carbamyl chlorides) and provide efficient contacting between the chlorine and the aromatic diisocyanate. A stirred kettle with a gas inlet means near the bottom may be employed, as may packed or unpacked towers, bubble-tray towers, etc. Equipment may be fabricated of glass, porcelain, glass-lined steel, stainless steel, or carbon steel.

After the desired amount of chlorine has been substituted, the product may be subjected to rectification to free it of catalyst and minor amounts of material containing more or less chlorine than desired.

The reaction may be carried out either continuously or batchwise.

Furthermore, I have discovered that the degree of polychlorination depends on the amount of ferric halide catalyst present. In the absence of a ferric halide catalyst, chlorination does not appreciably progress beyond the dichlorination stage, regardless of how long the passage of chlorine through the reaction mixture is continued. However, in the presence of from about 0.1 to about 1.0% ferric halide (based on weight of aromatic diisocyanate), the trichloro compound is formed readily, but only very small amounts of the tetrachloro compound are formed. But, if more than about 1.5% of ferric halide is present, excellent yields of the tetrachloro compound are formed.

The following examples will serve to illustrate my invention.

*Example I*

The apparatus used in this example comprised a 100 ml. 3-neck flask fitted with a thermometer, a mechanical stirrer, a gas-inlet tube extending to below the liquid level, and an electrically heated Vigreaux condensing column. The Vigreaux column was maintained at about 100° C. throughout the chlorination. The flask was charged with 36.5 (0.23 mol) grams of m-phenylene diisocyanate and warmed to 170° C. by means of an electric heating mantle. Chlorine was passed in at a rate of 0.2 mol/hr. for a period of 12 hours. During this period the temperature fluctuated between 170° and 180° C., and about 0.34 mols of chlorine reacted with the diisocyanate. About 90% of the reaction mixture was recovered by a simple vacuum distillation as a fraction boiling between 92° and 107° C. at 0.15 mm. Hg. This product consisted of about 40% monochloro and 60% dichloro-1,3-phenylene diisocyanate. The reaction did not result in the polychlorination of the isocyanate.

The experiment was repeated except that 0.05 gram of iodine was added. The product was substantially the same, indicating that iodine, a well-known and ordinarily effective chlorination promoter is without effect on this reaction.

*Example II*

The apparatus used in this experiment is the same as in Example I except that the flask used was of 500 ml. capacity. The flask was charged with 188 grams (1.2 mols) of m-phenylene diisocyanate and 1.8 grams of anhydrous ferric chloride, and its contents warmed to 150° C. Chlorine was passed in at the rate of 1.0 mol/hr. for 13 hours, during which time the temperature of the reaction mixture was held between 150° and 180° C. About 3.6 mols of chlorine reacted. A simple vacuum distillation yielded 281 grams of a product boiling between 144° and 155° C. at a pressure of 0.45 mm. Hg and which was found by analysis to consist of about 90% trichloro-m-phenylene diisocyanate and 10% tetrachloro-m-phenylene diisocyanate.

*Example III*

The apparatus and conditions were the same in this example as in Example II except that the charge consisted of 142 grams (0.89 mol) of m-phenylene diisocyanate and 3 grams of anhydrous ferric chloride. A total of 10.5 mols of chlorine was passed through the system, and about 3.4 mols reacted. Distillation gave 221 grams of product distilling between 157 and 160° C. at 0.55 mm. Hg of a product which was approximately 20% trichloro-m-phenylene diisocyanate and 80% tetrachloro-m-phenylene diisocyanate.

Examples II and III illustrate the effect of ferric halide catalyst on the polychlorination of aromatic diisocyanates. Examples II and III further illustrate that controlled amounts of catalyst will yield preferentially tri or tetrachloro substituted product.

*Example IV*

In this example, the apparatus and conditions were similar to those of Example I, except that the flask was charged with 35.2 grams (0.153 mols) of dichloro-m-phenylene diisocyanate and 0.05 grams of anhydrous ferric chloride and 92.3 grams (1.3 mols) of chlorine was led into the flask over a six hour period at a temperature of 160° C. During this period 0.13 mols of chlorine reacted by substitution with the diisocyanate. Distillation yielded 36.6 grams of product boiling between 115° and 128° C. at 0.24 mm. Hg. Analysis showed that a product containing 90% trichloro-m-phenylene diisocyanate resulted from this chlorination.

*Example V*

The apparatus and conditions were essentially the same as in Example II. The flask was charged with 313 grams (1.36 mols) of dichloro-m-phenylene diisocyanate and 6.0 grams of anhydrous ferric chloride. The flask contents were kept at 180°–190° C. and about 213 grams (3.0 mols) of chlorine was passed in during a period of about four hours. In this time about 2.4 mols of chlorine reacted by substitution. Distillation gave 372 grams of product boiling between 144° and 164° C. at 0.5 mm. Hg, the composition of which was approximately 10% trichloro-m-phenylene diisocyanate and 90% tetrachloro-m-phenylene diisocyanate.

Examples IV and V illustrate the polychlorination of aromatic diisocyanates wherein said diisocyanates have already present in the aromatic ring two chlorine atoms.

The properties of the polychlorinated m-phenylene diisocyanates (m-PDI's) prepared as in Examples I–V are listed in the following table. All were colorless solids with the characteristic odor of aromatic isocyanates.

| Compound | $Cl_3$-m-PDI | $Cl_4$-m-PDI |
| --- | --- | --- |
| Boiling Pt., °C./Pressure in mm. Hg | 194–95/31 | 216–17/32 |
| Melting Pt., °C., crude material | 65–68 | 76–78 |
| Melting Pt., °C., recryst. from hexane | 65–68 |  |
| Hydrolyzable chlorine | 0.000 | 0.000 |
| Amine Equivalent: Found/Theory | 130/132 | 147/149 |
| Analysis: Found/Theory— |  |  |
| Chlorine | 39.8/40.5 | 47.0/47.6 |
| Carbon | 37.1/36.5 |  |
| Hydrogen | 0.5/0.4 |  |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. The process of preparing tri and tetrachlorinated aromatic diisocyanates which comprises reacting chlorine with a melt of an aromatic diisocyanate whose nucleus is selected from the group consisting of phenyl and naphthyl, in the presence of a catalytic quantity of an anhydrous ferric halide selected from the group consisting of ferric chloride, ferric bromide and ferric iodide, maintaining the reaction mixture in a molten state throughout the reaction.

2. The process of claim 1 in which the ferric halide is ferric chloride.

3. The process of claim 1 in which the aromatic diisocyanate is a mono-nuclear aromatic diisocyanate.

4. The process of claim 1 in which the aromatic diisocyanate is a phenylene diisocyanate.

5. The process of claim 1 in which the aromatic diisocyanate is m-phenylene diisocyanate.

6. The process of preparing a trichloro aromatic diisocyanate which comprises reacting chlorine with a melt of a mononuclear aromatic diisocyanate in the presence of a catalytic quantity of an anhydrous ferric halide selected from the group consisting of ferric chloride, ferric bromide and ferric iodide, said ferric halide being present in the amount of about 0.1 to 1.0% by weight of said diisocyanate, maintaining the reaction mixture in a molten state throughout the reaction.

7. The process of preparing a tetrachloro aromatic diisocyanate which comprises reacting chlorine with a melt of a mononuclear aromatic diisocyanate in the presence of a catalytic quantity of an anhydrous ferric halide selected from the group consisting of ferric chloride, ferric bromide and ferric iodide, said ferric halide being present in the amount of over about 1.5% by weight of the diisocyanate, maintaining the reaction mixture in a molten state throughout the reaction.

8. The process of preparing tri and tetrachlorinated aromatic diisocyanates which comprises reacting chlorine with a melt of an aromatic diisocyanate selected from the group consisting of monochloro and dichloro mononuclear aromatic diisocyanates, in the presence of a catalytic quantity of an anhydrous ferric halide selected from the group consisting of ferric chloride, ferric bromide and ferric iodide, maintaining the reaction mixture in a molten state throughout the reaction.

9. The method of claim 8 in which the aromatic diisocyanate is a m-phenylene diisocyanate.

References Cited in the file of this patent

Siefken Justus Liebigs Annalen der Chemie 1949 (Band 562), pp. 90–91.